United States Patent
Amanullah (10) Patent No.: US 10,800,960 B2
(45) Date of Patent: *Oct. 13, 2020

(54) DATE TREE LEAFLET-BASED FLAKY LOST CIRCULATION MATERIAL

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 15/689,033

(22) Filed: Aug. 29, 2017

(65) Prior Publication Data

US 2018/0086962 A1    Mar. 29, 2018

Related U.S. Application Data

(60) Provisional application No. 62/400,379, filed on Sep. 27, 2016.

(51) Int. Cl.
| | | |
|---|---|---|
| C09K 8/035 | (2006.01) | |
| C09K 8/506 | (2006.01) | |
| E21B 21/00 | (2006.01) | |
| C09K 8/516 | (2006.01) | |

(52) U.S. Cl.
CPC .............. *C09K 8/035* (2013.01); *C09K 8/506* (2013.01); *C09K 8/516* (2013.01); *E21B 21/003* (2013.01); *C09K 2208/04* (2013.01)

(58) Field of Classification Search
CPC .... C09K 2208/04; C09K 8/035; C09K 8/506; C09K 8/516; E21B 21/003
See application file for complete search history.

(56) References Cited

U.S. PATENT DOCUMENTS

| | | |
|---|---|---|
| 2,483,936 A | 10/1949 | Roberts |
| 2,600,404 A | 6/1952 | Hoeppel |
| 2,749,308 A | 6/1956 | Beckum et al. |
| 2,779,417 A | 1/1957 | Clark, Jr. et al. |

(Continued)

FOREIGN PATENT DOCUMENTS

| | | |
|---|---|---|
| CN | 101311243 A | 11/2008 |
| CN | 101560084 A | 10/2009 |

(Continued)

OTHER PUBLICATIONS

International Search Report and Written Opinion for International Application No. PCT/US2017/027287 (SA5508/PCT); report dated Sep. 13, 2017; 11 pages.

(Continued)

*Primary Examiner* — Frances Tischler
(74) *Attorney, Agent, or Firm* — Bracewell LLP; Constance G. Rhebergen; Brian H. Tompkins (57) ABSTRACT

A lost circulation material (LCM) having flakes formed from date tree leaflets is provided. The flakes of the date tree leaflet LCM may be formed by tearing and shredding date tree leaflets from date trees. The date tree leaflets may be obtained from date tree pruning performed by date tree farming industries. The date tree leaflet LCM may be added to o a drilling fluid to mitigate or prevent lost circulation in a well. Methods of lost circulation control with the date tree leaflets LCM are also provided.

3 Claims, 3 Drawing Sheets

(56) References Cited

U.S. PATENT DOCUMENTS

| | | |
|---|---|---|
| 2,789,948 A | 4/1957 | Tronolone |
| 2,811,488 A | 10/1957 | Nestle et al. |
| 2,912,380 A | 11/1959 | Deane Groves |
| 2,943,679 A | 7/1960 | Scott, Jr. |
| 2,943,680 A | 7/1960 | Scott et al. |
| 3,147,127 A | 9/1964 | Shannon |
| 4,086,098 A | 4/1978 | Le Ruyet et al. |
| 4,110,225 A | 8/1978 | Cagle |
| 4,127,548 A | 11/1978 | Alexander |
| 4,275,788 A | 6/1981 | Sweatman |
| 4,619,772 A | 10/1986 | Black et al. |
| 5,004,553 A | 4/1991 | House et al. |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A | 1/2000 | Burts, Jr. |
| 6,098,712 A | 8/2000 | Burts, Jr. |
| 6,102,121 A | 8/2000 | Burts, Jr. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday et al. |
| 6,806,232 B1 | 10/2004 | Cart |
| 6,814,798 B2 | 11/2004 | Vijn et al. |
| 6,861,392 B2 | 3/2005 | Shaarpour |
| 6,932,158 B2 | 8/2005 | Burts |
| 7,226,895 B2 | 6/2007 | Xiang |
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,332,026 B2 | 2/2008 | Fyten et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,541,317 B2 | 6/2009 | Pomerleau |
| 7,629,297 B2 | 12/2009 | Shaarpour |
| 7,744,689 B2 | 6/2010 | Hojaji et al. |
| 7,795,184 B2 | 9/2010 | Pomerleau |
| 7,902,126 B1 | 3/2011 | Burts, Jr. |
| 7,923,413 B2 | 4/2011 | Ghassemzadeh |
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,376,607 B2 | 6/2016 | James |
| 9,410,066 B2 | 8/2016 | Ghassemzadeh |
| 9,416,306 B2 | 8/2016 | Savari et al. |
| 9,453,156 B2 | 9/2016 | Wu |
| 9,505,659 B2 | 11/2016 | Bickbau |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 10,597,575 B2 | 3/2020 | Amanullah et al. |
| 2002/0010100 A1 | 1/2002 | Wood |
| 2004/0023813 A1 | 2/2004 | Burts, III |
| 2004/0129460 A1 | 7/2004 | MacQuoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 | 7/2006 | Stamp |
| 2009/0054269 A1 | 2/2009 | Chatterji et al. |
| 2009/0286697 A1 | 11/2009 | Shaarpour |
| 2009/0305038 A1 | 12/2009 | Duran et al. |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1* | 9/2010 | Pomerleau ........ C09K 8/032 175/72 |
| 2011/0214870 A1 | 9/2011 | Shaarpour |
| 2011/0278006 A1 | 11/2011 | Sanders |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1 | 9/2014 | Kulkarni et al. |
| 2014/0318793 A1 | 10/2014 | Van Petergem et al. |
| 2014/0353043 A1 | 12/2014 | Amanullah et al. |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2016/0060985 A1 | 3/2016 | Lin et al. |
| 2016/0096988 A1 | 4/2016 | Lin et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0264839 A1 | 9/2016 | Mata et al. |
| 2016/0289528 A1 | 10/2016 | Wagle et al. |
| 2016/0312100 A1 | 10/2016 | Amanullah et al. |
| 2017/0058180 A1 | 3/2017 | Hossain et al. |
| 2017/0137688 A1 | 5/2017 | Amanullah |
| 2017/0166795 A1 | 6/2017 | Walker et al. |
| 2017/0240791 A1* | 8/2017 | Padua Oliveira ........ C09K 8/03 |
| 2017/0298263 A1 | 10/2017 | Amanullah |
| 2018/0002588 A1 | 1/2018 | Amanullah |
| 2018/0002589 A1 | 1/2018 | Amanullah |
| 2018/0016483 A1 | 1/2018 | Amanullah |
| 2018/0057729 A1 | 3/2018 | Amanullah |
| 2019/0177593 A1 | 6/2019 | Amanullah |
| 2019/0177594 A1 | 6/2019 | Amanullah |
| 2019/0177595 A1 | 6/2019 | Amanullah |
| 2019/0185731 A1 | 6/2019 | Amanullah |
| 2019/0185732 A1 | 6/2019 | Amanullah |
| 2019/0233705 A1 | 8/2019 | Amanullah et al. |
| 2019/0270924 A1 | 9/2019 | Amanullah |
| 2019/0292860 A1 | 9/2019 | Amanullah |
| 2019/0375973 A1 | 12/2019 | Amanullah |
| 2020/0002592 A1 | 1/2020 | Amanullah |
| 2020/0079987 A1 | 3/2020 | Amanullah |

FOREIGN PATENT DOCUMENTS

| | | |
|---|---|---|
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| JP | H0671171 A | 3/1994 |
| WO | WO2004013448 A2 | 2/2004 |
| WO | 2010019535 A2 | 2/2010 |
| WO | 2010088484 A2 | 8/2010 |
| WO | WO2010142370 A1 | 12/2010 |

(56) References Cited

FOREIGN PATENT DOCUMENTS

| WO | 2012037600 A1 | 3/2012 |
|---|---|---|
| WO | 2012061187 A2 | 5/2012 |
| WO | 2013039938 A1 | 3/2013 |
| WO | WO2014008598 A1 | 1/2014 |
| WO | 2014197417 A1 | 12/2014 |
| WO | WO2015142156 A1 | 9/2015 |
| WO | 2015199652 A1 | 12/2015 |
| WO | WO2016019416 A1 | 2/2016 |
| WO | WO2016028470 A1 | 2/2016 |
| WO | 2016172287 A1 | 10/2016 |
| WO | 2017087434 A1 | 5/2017 |
| WO | WO2018005575 A1 | 1/2018 |

OTHER PUBLICATIONS

International Search Report and Written Opinion for International Application No. PCT/US2017/067179 (SA5600/PCT) International Filing Date Dec. 19, 2017; Report dated Feb. 21, 2018; pp. 1-14.

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

International Search Report and Written Opinion for International Application No. PCT/US2018/034291 (SA5652/PCT); International Filing Date May 24, 2018; Report dated Jul. 31, 2018 (pp. 1-11).

Saudi Aramco "Local pal trees support technical solutions" Dhahran, Aug. 4, 2015; available as of Sep. 19, 2018 at the website: www.saudiaramco.com/en/home/news-media/news/local-palm-trees-support.htm.

Amanullah "Characteristics, behavior and performance of ARC Plug-A date seed-based sized particulate LCM." SPE Kingdom of Saudi Arabia Annual Technical Symposium and Exhibition. Society of Petroleum Engineers, 2016. (pp. 1-9).

International Search Report and Written Opinion for PCT/US2017/047877 (SA5577/PCT); Report dated Oct. 27, 2017; 15 pages.

International Search Report and Written Opinion for International Application No. PCT/US2017/053355 (SA5580); International filing date Sep. 26, 2017; Report dated Jan. 17, 2018 (pp. 1-14).

International Search Report and Written Opinion for International Application No. PCT/US2017/060079 (SA5577); International Filing Date Nov. 6, 2017; Report dated Dec. 18, 2017 (pp. 1-14).

Alsaba, M. et al. "Review of lost circulation materials and treatments with an updated classification." AADE National Technical Conference and Exhibition, Houston, TX, Apr. 2014. pp. 1-9.

International Search Report and Written Opinion for International Application No. PCT/US2016/062130 (SA5410/PCT); Report dated Jan. 27, 2017 (pp. 1-12).

Wajheeuddin, M. et al. "An experimental study on particle sizing of natural substitutes for drilling fluid applications." Journal of Nature Science and Sustainable Technology 8.2 (2014): pp. 1-14.

International Search Report and Written Opinion for International Application No. PCT/US2018/048428 (SA5757); International Filing Date Aug. 29, 2018; Report dated Nov. 29, 2018 (pp. 1-12).

Amanullah, et al.: "Application of an indigenous eco-friendly raw material as fluid loss additive", Journal of Petroleum Science and Engineering, vol. 139, (2016) pp. 191-197.

BakerHughes.com "SOLUFLAKE Flaked Calcium Carbonate" (XP055401101) dated Jan. 8, 2016 (1 Page).

International Search Report and Written Opinion for International Application No. PCT/US2017/039614 (SA5532/PCT); Report dated Sep. 11, 2017; pp. 1-12.

International Search Report and Written Opinion for International Application No. PCT/US2017/039616 (SA5533/PCT); Report dated Sep. 11, 2017; pp. 1-11.

International Search Report and Written Opinion for International Application No. PCT/US2017/041611 (SA5534); International Filing Date Jul. 12, 2017; Report dated Oct. 27, 2017 (pp. 1-15).

Wajheeuddin, Mohammed; "Development of an Environmentally-Friendly Drilling Fluid Using Date Seeds and Grass" Masters thesis, King Fand University of Petroleum & Minerals, 2014; pp. 1-138.

\* cited by examiner

DATE TREE LEAFLET-BASED FLAKY LOST CIRCULATION MATERIAL

CROSS-REFERENCE TO RELATED APPLICATIONS

This application claims priority from U.S. Provisional Application No. 62/400,379 filed Sep. 27, 2016, and titled "DATE TREE LEAFLET-BASED FLAKY LOST CIRCULATION MATERIAL." For purposes of United States patent practice, this application incorporates the contents of the Provisional application by reference in its entirety.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (or drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs. Formations with low permeability zones, that is, those with microscopic cracks and fissures, usually have seepage type lost circulation. Other formations may experience lost circulation if an improper mud weight is used while drilling

SUMMARY

Lost circulation materials (LCMs) are used to mitigate the lost circulation by blocking the path of the drilling mud into the formation. The type of LCM used in a lost circulation situation depends on the extent of lost circulation and the type of formation. Different types of loss control materials (LCMs) such as granular, fibrous and flaky materials are frequently used either alone or in combination to control loss of circulation.

Costs incurred in loss circulation situations may be due to losses of drilling fluids, losses of cement, losses of production or nonproductive time (NPT), LCM failure rate, and the costs of LCMs. The purchase and importation of LCMs to drilling locations may be expensive and time-consuming. Additionally, lost circulation can cause environmental problems if drilling fluids or LCMs interact with the environment surrounding the reservoir. The manufacture, use, and disposal of some conventional LCMs may pose a risk to sensitive environments, such as marine environments because they are not biodegradable and can be toxic to marine life.

In one embodiment, a method to control lost circulation in a lost circulation zone in a wellbore. The method includes introducing an altered drilling fluid into the wellbore such that the altered drilling fluid contacts the lost circulation zone and reduces a rate of lost circulation into the lost circulation zone. The altered drilling fluid comprises a drilling fluid and a lost circulation material (LCM). The LCM comprises a plurality of processed date tree leaflets.

In some embodiments, the altered drilling fluid consists of the drilling fluid and the LCM. In some embodiments, the LCM consists of the plurality of processed date tree leaflets. In some embodiments, the plurality of processed date tree leaflets comprise a concentration of at least 10 pounds-per-barrel in the altered drilling fluid. In some embodiments, the processed date tree leaflets comprise untreated date tree leaflets. In some embodiments, the plurality of processed date tree leaflets comprises a plurality of flakes. In such embodiments, the plurality of flakes comprises shredded date tree leaflets. In such embodiments, each of the plurality of flakes has a length in the range of 5 millimeters (mm) to 8 mm, a width in the range of 3 mm to 5 mm, a thickness in the range of 0.05 mm to 0.15 mm, and an areal coverage in the range of 15 square millimeters ($mm^2$) to about 40 $mm^2$.

In another embodiment, an altered drilling fluid is provided that includes a drilling fluid and a lost circulation material (LCM) that includes a plurality of processed date tree leaflets. In some embodiments, the LCM consists of the plurality of processed date tree leaflets. In some embodiments, the plurality of processed date tree leaflets comprise a concentration of at least 10 pounds-per-barrel. In some embodiments, the plurality of processed date tree leaflets comprise a plurality of untreated date tree leaflets, wherein the untreated date tree leaflets are not introduced to an alkali, an acid, a bleaching or an oxidation agent before forming the LCM. In some embodiments, the plurality of plurality of processed date tree leaflets comprises shredded date tree leaflets. In some embodiments, the plurality of processed date tree leaflets comprises a plurality of flakes. In such embodiments, each of the plurality of flakes has a length in the range of 5 millimeters (mm) to 8 mm, a width in the range of 3 mm to 5 mm, a thickness in the range of 0.05 mm to 0.15 mm, and an areal coverage in the range of 15 square millimeters ($mm^2$) to about 40 $mm^2$.

In another embodiment, a method of manufacturing a lost circulation material (LCM) is provided. The method includes separating a plurality of date tree leaflets from date tree pruning waste and processing the plurality of date tree leaflets to form a lost circulation material (LCM) comprising a plurality of flakes produced by the processing of the plurality of date tree leaflets. In some embodiments, the LCM consists of the plurality of flakes. In some embodiments, the plurality of date tree leaflets comprise a plurality of untreated date tree leaflets, wherein the plurality of untreated date tree leaflets are not introduced to an alkali, an acid, a bleaching or an oxidation agent before forming the LCM. In some embodiments, the processing the plurality of date tree leaflets includes tearing the plurality of date tree leaflets into a plurality of date tree leaflet strips and shredding the plurality of date tree leaflet strips into the plurality of flakes. In some embodiments, each of the plurality of flakes has a length in the range of 5 millimeters (mm) to 8 mm, a width in the range of 3 mm to 5 mm, a thickness in the range of 0.05 mm to 0.15 mm, and an areal coverage in the range of 15 square millimeters (mm$^2$) to about 40 mm$^2$.

In another embodiment, lost circulation material (LCM) composition is provided that includes a plurality of flakes formed from a plurality of date tree leaflets. In some embodiments, the date tree leaflets comprise untreated date tree leaflets, wherein the untreated date tree leaflets are not introduced to an alkali, an acid, a bleaching or an oxidation agent before forming the LCM. In some embodiments, each of the plurality of flakes has a length in the range of 5 millimeters (mm) to 8 mm, a width in the range of 3 mm to 5 mm, a thickness in the range of 0.05 mm to 0.15 mm, and an areal coverage in the range of 15 square millimeters (mm$^2$) to about 40 mm$^2$.

DETAILED DESCRIPTION

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

Embodiments of the disclosure include a date tree leaflet LCM that includes flakes formed from date tree leaflets to mitigate or prevent lost circulation in a well, as well as provide seepage control and minimize or prevent fluid loss. The flakes provide unified flow barriers to the loss of drilling fluid while drilling or the loss of cement slurry while cementing a well. In some embodiments, the flakes may have a generally rectangular shape. For example, For example, when introduced into a loss zone, the rectangular shapes of such flakes may create a carpet-like mat at the borehole wall to seal, block, and plug porous and permeable channels, fractures, cracks, figures, and vugs that may cause lost circulation.

In some embodiments, the date tree leaflets LCM may include flakes formed from untreated date tree leaflets. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass tearing, grinding, cutting, or heating to remove moisture, but does encompass chemical or other processes that may change the characteristics or properties of the LCM. In accordance with this definition, an LCM that is treated may behave in a manner different than its original starting material. In such embodiments, the flakes formed from the date tree leaflets may be manufactured without treating before, during, or after separation, cleaning, or any other processing.

Figure 1:
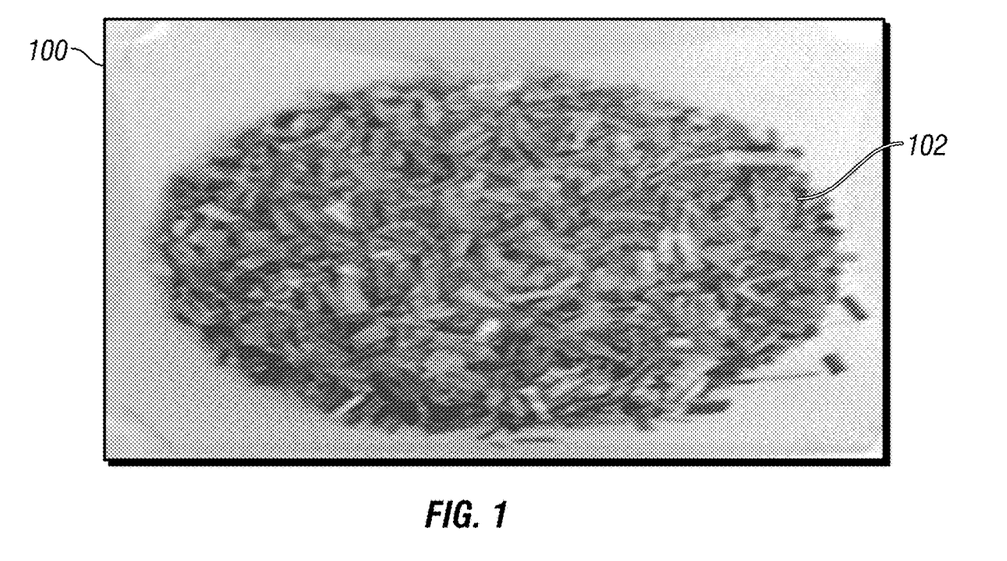
FIG. 1 is a photograph of flakes formed from date tree leaflets in accordance with an embodiment of the disclosure.

FIG. 1 is a photograph 100 of flakes 102 formed from date tree leaflets. In some embodiments, the flakes may have a generally rectangular shape. In some embodiments, the flakes 102 may have a length in the range of about 5 millimeters (mm) to about 8 mm. In some embodiments, the flakes 102 may have a width in the range of about 3 mm to about 5 mm. In some embodiments, the flakes 102 may have a thickness in the range of about 0.05 mm to about 0.15 mm. In some embodiments, the areal coverage each flake may be in the range of about 15 mm$^2$ to about 40 mm$^2$. In embodiments, a date tree leaflet LCM having such flakes may mitigate or prevent lost circulation in a loss zone area ranging from 15 mm$^2$ to about 40 mm$^2$. Thus, the date tree leaflet LCM described in the disclosure may block or seal fractures having openings or channels close to the surface area coverage of the flakes formed from the date tree leaflets. Hence, the newly developed LCMs can seal and block more than one fracture widths of a potential loss zone to prevent the loss of whole mud while drilling or loss of cement slurry while cementing a wellbore.

The date tree leaflets may be obtained from the pruning waste produced by date tree farming and date processing industries, resulting in a relatively large and sustainable source of leaflets for use in the date tree leaflet LCM described in the disclosure. Further, the biodegradable, non-toxic, and environmentally friendly properties of the date tree leaflet LCM may have superior environmental performance as compared to conventional flake LCMs. For example, the date tree leaflet LCM described in the disclosure may meet or exceed environment regulations for drilling and cementing operations as compared to cellophane flake LCMs or other artificial flake LCMs.

EXAMPLES

Figure 2:
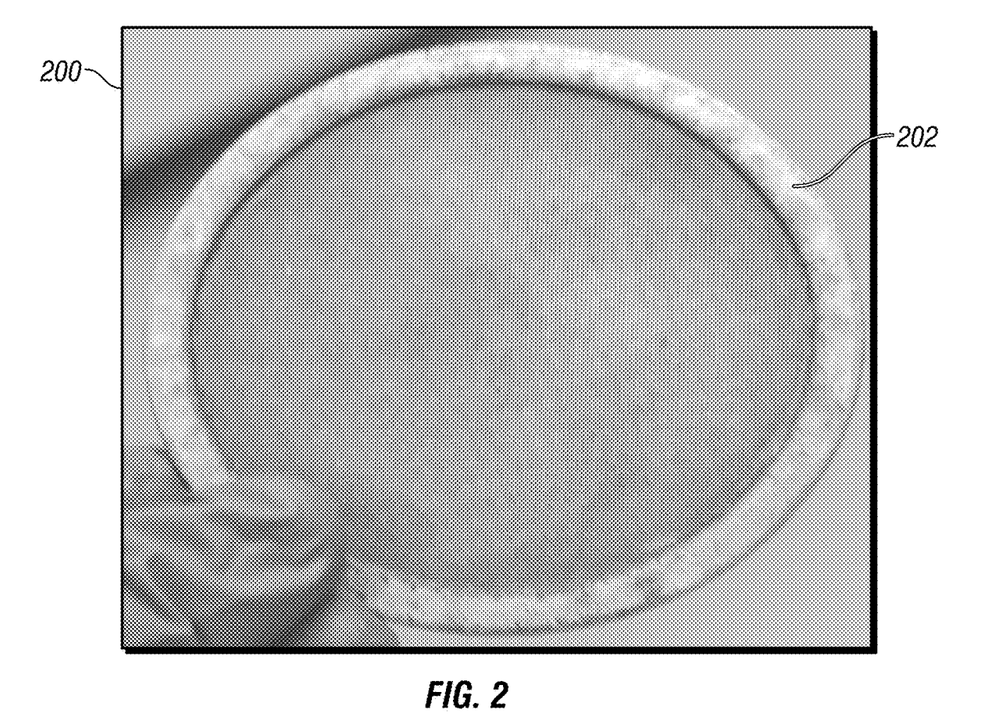
FIG. 2 is a photograph of a metallic screen for sealing and blocking efficiency tests in accordance with an embodiment of the disclosure.

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure The following non-limiting examples of a date tree leaflet LCM were prepared and evaluated against a commercially available LCM. Sealing and blocking efficiency tests were conducted on the date tree leaflet LCM and a commercially available LCM using a 250 micron porous metallic screen to simulate a high permeability loss zone. FIG. 2 is a photograph 200 of the 250 micron porous metallic screen 202 used to simulate a high permeability loss zone.

The tests were conducted at conditions of ambient temperature and about 100 psi differential pressure. For the sealing and blocking efficiency tests, the date tree leaflet LCM and commercially available LCM were incorporated into a 65 pounds per cubic foot (pcf) bentonite mud. The composition of the 65 pcf bentonite mud with mud components expressed in pounds-per-barrels (lb/bbl or ppb) is shown in Table 1:

TABLE 1

Composition of 65 pcf bentonite mud

| Mud Component | Lb/bbl |
|---|---|
| Water | 330.67 |
| Bentonite | 25.00 |
| Caustic Soda | 0.25 |
| Soda Ash | 0.25 |

Figure 3:
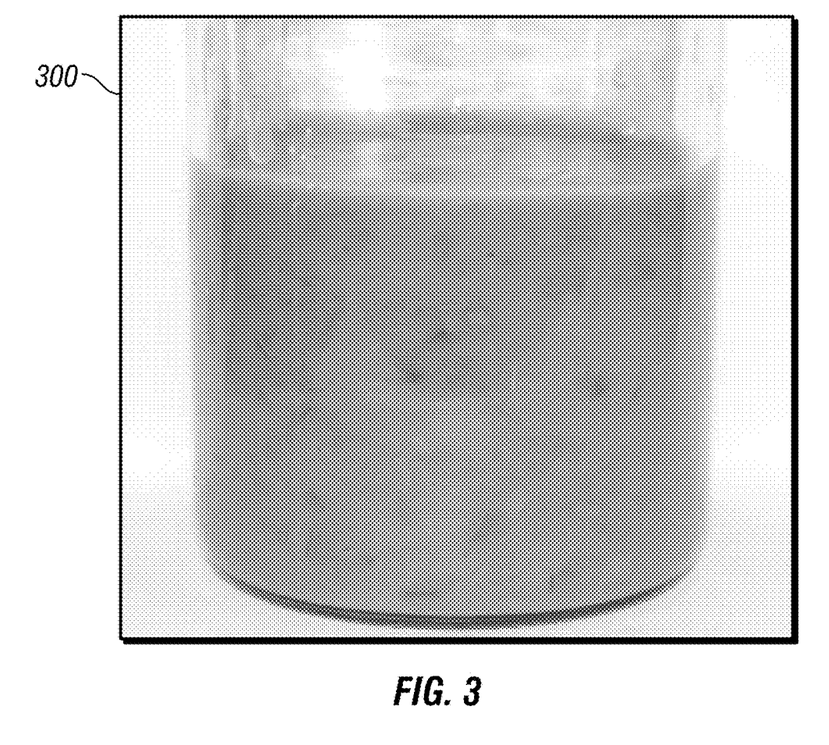
FIG. 3 is a photograph of a bentonite mud mixed with a date tree leaflet LCM in accordance with an embodiment of the disclosure.

The date tree leaflet LCM was tested at concentrations of 10 ppb in the 65 pcf bentonite mud and at 15 ppb in the 65 pcf bentonite mud. The 10 ppb solution was prepared by adding 10 grams of date tree leaflet LCM flakes to 350 cc of the 65 pcf bentonite mud. The 15 ppb solution was prepared by adding 15 grams of date tree leaflet LCM flakes to 350 cc of the 65 pcf bentonite mud. The 10 ppb and 15 ppb were added to the 65 pcf bentonite mud, mixed, and then tested using the 250 micron porous metallic screen to simulate a high permeability loss zone. FIG. 3 is a photograph 300 of the 65 pcf bentonite mud mixed with the date tree leaflet LCM (which may form or be referred to as a "pill").

The 65 pcf bentonite mud without the date tree leaflet LCM and the 65 pcf bentonite mud with 10 ppb and 15 ppb concentrations of the date tree leaflet LCM were tested using the following test procedure and an American Petroleum Institute (API) test apparatus having a test cell to contain the composition undergoing testing and the 250 micron porous metallic screen:
1. Prepare each composition;
2. Fill test cell of API test apparatus with a 350 cubic centimeter (cc) pill of the formulation;
3. Mount test cell to API test apparatus, affix the upper lid, and connect an air pressure line at about 100 psi pressure; and
4. Measure the total leak off over a testing time period.

Table 2 shows the results of the sealing and blocking efficiency tests for the 65 bentonite mud without the date tree leaflet LCM and the date tree leaflet LCM at the 10 ppb and 15 ppb concentrations in the 65 pcf bentonite mud, with the total leak off measured in milliliters (ml) and the test duration measured in seconds (sec) or minutes (min):

TABLE 2

Plugging Efficiency Test Results for 65 pcf bentonite mud and Date Tree Leaflet LCM

| Mud | LCM | Concentration | Total Leak off (cc) | Test Duration |
|---|---|---|---|---|
| 65 pcf bentonite mud | No LCM | Based mud | All mud lost | 30 sec |
| 65 pcf bentonite mud | Date tree leaflet LCM | 10 ppb | 18 ml | 30 min |
| 65 pcf bentonite mud | Date tree leaflet LCM | 15 ppb | 18 ml | 30 min |

Figure 4:
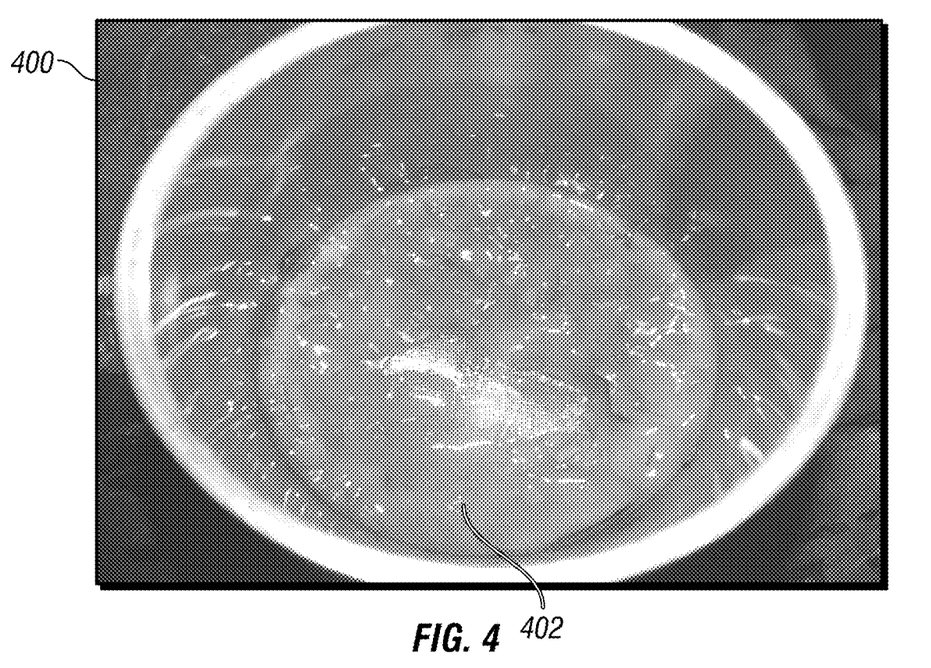
FIG. 4 is a photograph of a seal formed by the date tree leaflet LCM in a metallic screen after sealing and blocking efficiency tests in accordance with an embodiment of the disclosure.

FIG. 4 is a photograph 400 showing a seal 402 in the 250 micron porous metallic screen 202 formed by the date tree leaflet LCM after the sealing and blocking efficiency tests. FIG. 4 depicts the carpet-like mat formed by the date tree leaflet LCM during the test conditions that seals, blocks, and plugs the 250 micron porous metallic screen 202. As shown in Table 2, the whole bentonite mud without the date tree leaflet LCM was lost immediately after (approximately 30 seconds) applying the 100 psi testing pressure. In contrast, as shown in Table 2, the 10 ppb concentration of the date tree leaflet LCM exhibited only 18 ml loss of whole mud after 30 minutes of applying the 100 psi testing pressure. Similarly, the 15 ppb concentration of the date tree leaflet LCM exhibited only 18 ml loss of whole mud after 30 minutes of applying the 100 psi testing pressure. Thus, at both the 10 ppb and 15 ppb concentrations, the date tree leaflet LCM in the 65 pcf bentonite mud exhibited negligible loses of whole mud and a large reduction in the rate of fluid loss. Consequently, at both the 10 ppb and 15 ppb concentrations, the date tree leaflet LCM demonstrated the formation of an effective flow barrier that prevented the loss of whole mud. Moreover, as shown in Table 2, the date tree leaflet LCM at 10 ppb concentration in the 65 pcf bentonite mud was a sufficient concentration to prevent of the loss of greater than a negligible amount of whole mud.

The date tree leaflet LCM was also tested against a commercial flake LCM, Celloflake manufactured by Sodium Solutions, Inc. of Acheson, Alberta, Canada. The commercial flake LCM was tested at a concentration of 10 ppb/bbl in the 65 pcf bentonite mud. The 10 ppb solution was prepared by adding 10 grams of date tree leaflet LCM flakes to 350 cc of the 65 pcf bentonite mud. The date tree leaflet LCM was again tested at concentrations of 10 ppb/bbl in the 65 pcf bentonite mud and at 15 ppb/bbl in the 65 pcf bentonite mud, prepared in the manner previously discussed.

The commercial flake LCM was added to the 65 pcf bentonite mud, mixed, and then tested using the 250 micron porous metallic screen to simulate a high permeability loss zone. The test was conducted using the test procedure and an American Petroleum Institute (API) test apparatus having a test cell, as described supra.

TABLE 3

Plugging Efficiency Test Results for Date Tree Leaflet LCM and Commercial LCM

| Mud | LCM | Concentration | Total Leak off (cc) | Test Duration |
|---|---|---|---|---|
| 65 pcf bentonite mud | Date tree leaflet LCM | 10 ppb | 18 ml | 30 min |
| 65 pcf bentonite mud | Celloflake | 10 ppb | 5 ml | 30 min |

As shown in Table 3, the 10 ppb concentration of the Celloflake commercially available LCM exhibited 5 ml loss of whole mud after 30 minutes of applying the 100 psi testing pressure. Accordingly, as also shown in Table 3, both the date tree leaflet LCM and commercially available LCM (Celloflake) exhibited negligible loses of whole mud and a large reduction in the rate of fluid loss. Consequently, at 10 ppb concentration in the 65 pcf bentonite mud, the date tree leaflet LCM demonstrated comparable performance to the commercially available LCM. Thus, the date tree leaflet LCM may be a suitable alternative to commercially available flake LCMs.

Date Tree Leaflet LCM Manufacture and Use

In some embodiments, a date tree leaflet LCM may include flakes formed from processes date tree leaflets. The date tree leaflets may be produced as a waste by-product from date tree farming and date processing, and the date tree leaflets may be obtained from the pruning of date trees and date processing plants to provide sustainable source of material for the date tree leaflet LCM. Moreover, local sources of date tree leaflets may reduce the cost of imported LCM products, components, or both. In some embodiments, the date tree leaflets may be obtained from the species *phoenix dactylifera*. It should be appreciated that, in some embodiments, the date tree leaflets may be obtained from genetically modified date trees (that is, genetically modified organisms (GMOs)).

In some embodiments, the date tree leaflet LCM may include flakes having a generally rectangular shape. In some embodiments, the date tree leaflet LCM may include flakes having a length in the range of about 5 mm to about 8 mm. In some embodiments, the date tree leaflet LCM may include flakes having a width in the range of about 3 mm to about 5 mm. In some embodiments, the date tree leaflet LCM may include flakes having a thickness in the range of about 0.05 mm to about 0.15 mm. In some embodiments, the date tree leaflet LCM may include flakes having an areal coverage in the range of about 15 $mm^2$ to about 40 $mm^2$, such that the flakes may mitigate or prevent lost circulation in a loss zone area ranging from 15 $mm^2$ to about 40 $mm^2$.

In some embodiments, the date tree leaflets may include untreated date tree leaflets, thus preserving the environmentally-friendly and biodegradable properties of the manufacturing process, the leaflets, and the resulting LCM composition. For example, the flakes of the date tree leaflet LCM may be formed from untreated date tree leaflets. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the leaflets and the flakes formed from the processed leaflets. In such embodiments, the date tree leaflets may be manufactured without treating before, during, or after drying or any other processing.

In some embodiments, the date tree leaflet LCM may be added directly to a drilling fluid, such as a drilling mud, to create an altered drilling fluid having the date tree leaflet LCM. For example, in some embodiments, the date tree leaflet LCM may be added to (for example, blended with) an oil-based drilling mud or a water-based drilling mud. In some embodiments, the date tree leaflet LCM may be added at the mud pit of a mud system. After addition of the date tree leaflet LCM to a drilling fluid, the altered drilling fluid may be circulated at a pump rate effective to position the altered drilling fluid into contact with a lost circulation zone in a wellbore, such that the date tree leaflet LCM alters the lost circulation zone (for example, by entering and blocking porous and permeable paths, cracks, and fractures in a formation in the lost circulation zone, such as forming a plug in a fracture).

In some embodiments, the date tree leaflet LCM may be used with one or more additional LCMs. For example, in such embodiments, one or more additional LCMs and the date tree leaflet LCM may be may be added directly to a drilling fluid, such as a drilling mud, simultaneously or in a specific order, to create one or more altered drilling fluids that may be circulated at a pump rate effective to position the altered drilling fluid into contact with a lost circulation zone in a wellbore.

As noted in the disclosure, the eco-friendly, non-toxic, and environmentally friendly properties of the date tree leaflet LCM may minimize or prevent any environmental impact, any effect on ecosystems, habitats, population, crops, and plants surrounding the drilling site where the date tree leaflet LCM is used. Additionally, the date tree leaflet LCM may have comparable performance to cellophane flake LCMs or other artificial flake LCMs. Thus, date tree leaflet LCM may be used as a replacement LCM for cellophane flake LCMs or other artificial flake LCMs.

Figure 5:
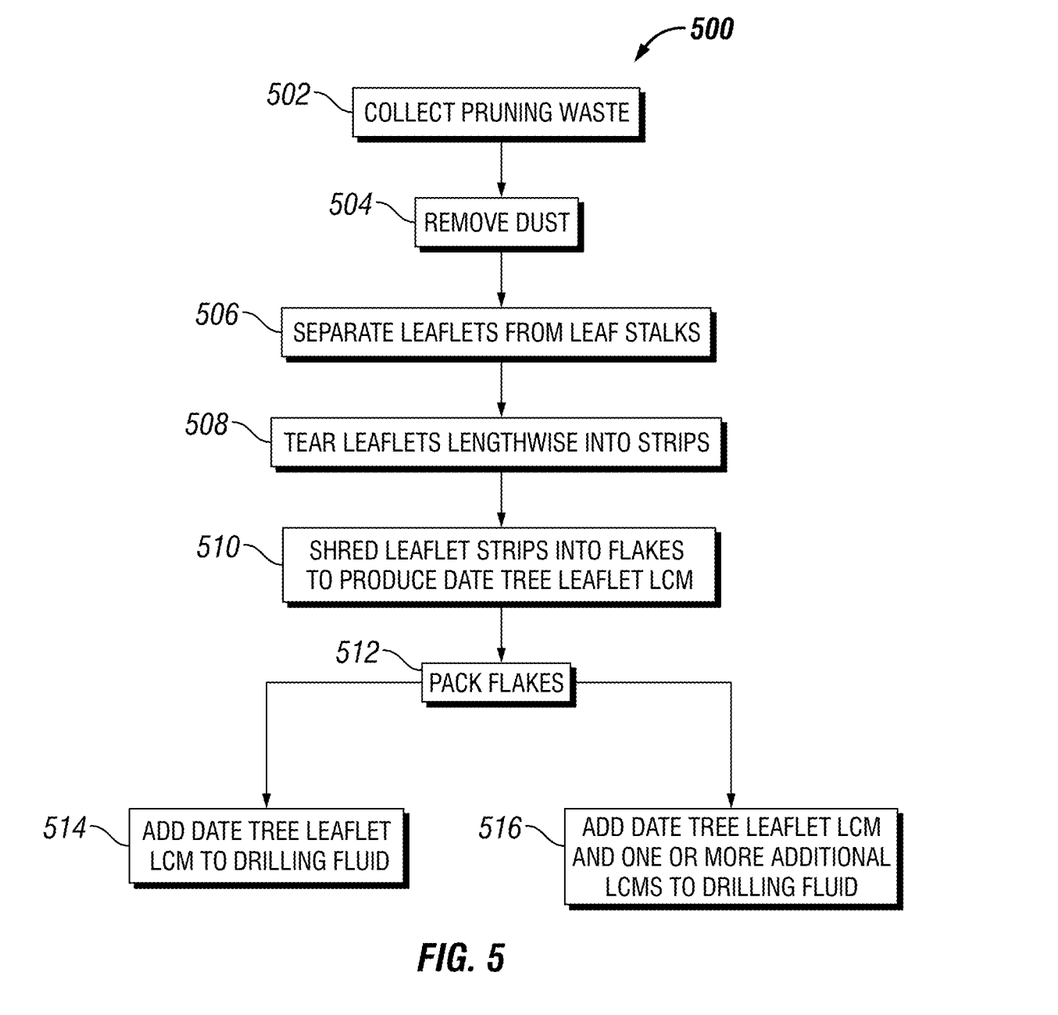
FIG. 5 is a block diagram of a process for manufacturing and using a date tree leaflet LCM in accordance with an embodiment of the disclosure.

FIG. 5 depicts a process 500 for manufacturing and using a date tree leaflet LCM in accordance with an embodiment of the disclosure. Initially, pruning waste from the pruning of date trees may be collected (block 502). The pruning waste may include date tree leaflets, date tree leaf stalks, and other date tree components removed during pruning of date trees. For example, date tree pruning may be performed at regular intervals (for example, yearly), resulting in a regular collection of date tree pruning waste. Dust may be removed from the pruning waste (block 504), such as by shaking and vibrating the pruning waste. In other embodiments, additional or alternative techniques may be used to remove dust from the pruning waste, such as blowing air over the pruning waste.

Next, the date tree leaflets may be separated from the date tree leaf stalks and any other pruning waste (block 506). For example, in some embodiments, the leaflet may be separated by using a sharp edge cutter to move along the leaflet point attached to the leaf stalk. The separated leaflets may be torn lengthwise into strips (block 508). In some embodiments, the leaflet strips may have width in the range of about 3 mm to about 5 mm. In some embodiments, the leaflets may be torn manually using a fork-like tearing tool. In other embodiments, the leaflets may be torn automatically using a commercial industrial tearing tool having suitable speed, width, and size control capabilities (for example, a tool that enables the production of strips having a width in the range of about 3 mm to about 5 mm).

The leaflet strips may then be shredded or otherwise processed into flakes (block 510). In some embodiments, the flakes have length of about 5 mm to about 8 mm. In some embodiments, the leaflet strips may be manually shredded. In other embodiments, the leaflet strips may be automatically shredded, cut, or otherwise processed using a commercial industrial shredded and cutting tool having suitable speed, width, and size control capabilities. As shown in some embodiments, the flakes may be packed (block 512). For example, the date tree leaflet flakes may be packed in paper bags containing about 25 kilograms (kg) of flakes. In some embodiments, a suitable amount of packed date tree leaflet flakes may then be transported to an oil and gas operations site for use as a date tree waste LCM.

In some embodiments, the date tree leaflet LCM may be added directly to a drilling fluid (block 514), such as a drilling mud, to create an altered drilling fluid having the LCM. For example, in some embodiments, the date tree leaflet LCM may be added to (for example, blended with) an oil-based drilling mud or a water-based drilling mud. In some embodiments, the date tree leaflet LCM may be added at the mud pit of a mud system. After addition of the date tree leaflet LCM to a drilling fluid, the altered drilling fluid may be circulated at a pump rate effective to position the drilling fluid into contact with a lost circulation zone in a wellbore, such that the flakes of the date tree leaflet LCM alters the lost circulation zone (for example, by entering and blocking porous and permeable paths, cracks, and fractures in a formation in the lost circulation zone).

In some embodiments, the date tree leaflet LCM and one or more additional LCMs may be added to a drilling fluid (block 516), such as a drilling mud, to create an altered drilling fluid having the LCMs. For example, in some embodiments, the date tree leaflet LCM and one or more additional LCMs may be added to an oil-based drilling mud or a water-based drilling mud. In other embodiments, the date tree leaflet LCM may be added to a cement slurry for use in a cementing operation.

The biodegradation properties of the date tree leaflet LCM may enable the date tree leaflet LCM to easily degrade and disappear from the environment over time and minimize or prevent any environmental impact. Further, the non-toxic properties of the date tree leaflet LCM may minimize or prevent any effect on ecosystems, habitats, population, crops, and plants surrounding the drilling site where the date tree leaflet LCM is used.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to control lost circulation in a lost circulation zone in a wellbore, comprising:

introducing an altered drilling fluid into the wellbore such that the altered drilling fluid contacts the lost circulation zone and reduces a rate of lost circulation into the lost circulation zone, where the altered drilling fluid consists of a drilling fluid and a lost circulation material (LCM), wherein the LCM consists of a plurality of processed date tree leaflets comprising a plurality of flakes, wherein each of the plurality of flakes has a length in the range of 5 millimeters (mm) to 8 mm, a width in the range of 3 millimeters (mm) to 5 mm, a thickness in the range of 0.05 millimeters (mm) to 0.15 mm, and an areal coverage in the range of 15 square millimeters ($mm^2$) to about 40 $mm^2$, wherein the plurality of processed date tree leaflets comprise a concentration of at least 10 pounds-per-barrel in the altered drilling fluid, wherein the drilling fluid consists of a bentonite mud, the bentonite mud comprising water, bentonite, caustic soda, and soda ash.

2. The method of claim 1, wherein the processed date tree leaflets comprise untreated date tree leaflets.

3. The method of claim 1, wherein the plurality of flakes are produced from shredded date tree leaflets.

* * * * *